(12) United States Patent
Sun et al.

(10) Patent No.: US 10,571,578 B2
(45) Date of Patent: Feb. 25, 2020

(54) SYSTEM INCLUDING BASE STATIONS THAT PROVIDE INFORMATION FROM WHICH A MOBILE STATION CAN DETERMINE ITS POSITION

(71) Applicant: Honeywell International Inc., Morris Plains, NJ (US)

(72) Inventors: Jianhua Sun, Beijing (CN); Wenjun Cao, Beijing (CN); Aloke Roy, Gaithersburg, MD (US); Xiaochen Liu, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/557,076

(22) PCT Filed: Aug. 5, 2016

(86) PCT No.: PCT/CN2016/093530
§ 371 (c)(1),
(2) Date: Sep. 8, 2017

(87) PCT Pub. No.: WO2018/023700
PCT Pub. Date: Feb. 8, 2018

(65) Prior Publication Data
US 2018/0275284 A1  Sep. 27, 2018

(51) Int. Cl.
*G01S 19/46* (2010.01)
*G01S 19/07* (2010.01)
*H04W 64/00* (2009.01)

(52) U.S. Cl.
CPC .............. *G01S 19/46* (2013.01); *G01S 19/07* (2013.01); *H04W 64/00* (2013.01)

(58) Field of Classification Search
CPC .................................. H04W 4/02; G01S 19/34
(Continued)

(56) References Cited

U.S. PATENT DOCUMENTS 6,211,819 B1  4/2001  King et al.
7,893,869 B2  2/2011  Gaal et al.
(Continued)

FOREIGN PATENT DOCUMENTS

| EP | 1143261 | 10/2001 |
|---|---|---|
| EP | 2367023 | 1/2015 |
| WO | 9518977 | 7/1995 |

OTHER PUBLICATIONS

Ali et al., "A Matlab Implementation of Differential GPA for Low-cost GPS Receivers", "The International Journal on Marine Navigation and Safety of Sea Transportation", Sep. 2014, pp. 343-350, vol. 8, No. 3.

*Primary Examiner* — Kiet M Doan
(74) *Attorney, Agent, or Firm* — Bookoff McAndrews, PLLC

(57) ABSTRACT

In an embodiment, a system includes base stations and a server. Each base station has a respective fixed position, and is configured to broadcast information that a mobile station can use to determine a position of the mobile station. And the server is configured to communicate with the base stations and to track a position of a mobile station. An example of such a system is an Aeronautical Mobile Airport Communications System (AeroMACS), which includes base stations that are located in respective fixed, known positions within and around an airport, and at least one server that communicates with the base stations and tracks the positions of moveable stations within and around the airport. The base stations can provide information that allows both GNSS-enabled and non-GNSS-enabled mobile stations to determine their positions without adding significant cost or complexity to the AeroMACS.

11 Claims, 8 Drawing Sheets

(58) Field of Classification Search
USPC ............... 455/456.1, 456.3, 456.5; 342/464,
342/357.27, 357.29, 357.65, 357.63,
342/357.41, 357.28; 370/329, 350
See application file for complete search history.

(56) References Cited

U.S. PATENT DOCUMENTS

| | | | |
|---|---|---|---|
| 9,606,238 B2 | 3/2017 | Carter | |
| 2003/0220116 A1* | 11/2003 | Sagefalk | G01S 5/0252 |
| | | | 455/456.1 |
| 2010/0149032 A1* | 6/2010 | Feller | G01S 19/05 |
| | | | 342/357.43 |
| 2011/0199260 A1* | 8/2011 | Garrett | G01S 5/0242 |
| | | | 342/357.35 |
| 2012/0182181 A1* | 7/2012 | Dai | G01S 19/41 |
| | | | 342/357.31 |
| 2014/0165091 A1* | 6/2014 | Abhyanker | G06Q 30/02 |
| | | | 725/27 |
| 2015/0253431 A1* | 9/2015 | Averin | G01S 19/07 |
| | | | 342/357.26 |
| 2016/0259061 A1* | 9/2016 | Carter | G01S 19/05 |
| 2017/0200306 A1* | 7/2017 | Marsolek | G06T 17/05 |

\* cited by examiner

SYSTEM INCLUDING BASE STATIONS THAT PROVIDE INFORMATION FROM WHICH A MOBILE STATION CAN DETERMINE ITS POSITION

This application claims priority to International Patent Application No. PCT/CN2016/093530.

SUMMARY

In an embodiment, a system includes base stations and a server. Each base station has a respective fixed position, and is configured to broadcast information that a mobile station can use to determine a position of the mobile station. And the server is configured to communicate with the base stations and to track a position of a mobile station.

An example of such a system is an Aeronautical Mobile Airport Communications System (AeroMACS), which is a system that complies with the AeroMACS standard. An AeroMACS includes base stations that are located in respective fixed, known positions within and around an airport, and at least one server that communicates with the base stations and tracks the positions of moveable, i.e., mobile, stations within and around the airport. Examples of mobile stations include airplanes, fuel trucks, baggage trucks/carts, other aircraft-service vehicles, and even tarmac personnel such as baggage handlers. If a mobile station includes an electronic positioning circuit or system for use with a Global Navigation Satellite System (GNSS), such as the United States NAVSTAR Global Positioning System (GPS), or other satellite-based position system, then the base stations can be configured to broadcast, to the mobile station, information that the mobile station can use to increase the accuracy of the mobile station's GNSS position determination. And if a mobile station does not include an electronic GNSS system, then the base stations can be configured to broadcast, to the mobile station, information from which the mobile station can determine its position. Because the base stations are included in the system anyway, e.g., to allow communications between the server and the mobile stations (much like cell towers allow communications between the telephone network and mobile phones), one can configure the base stations to broadcast information from which a mobile station can determine its position without adding significant complexity or cost to an AeroMACS.

DETAILED DESCRIPTION

Figure 1:
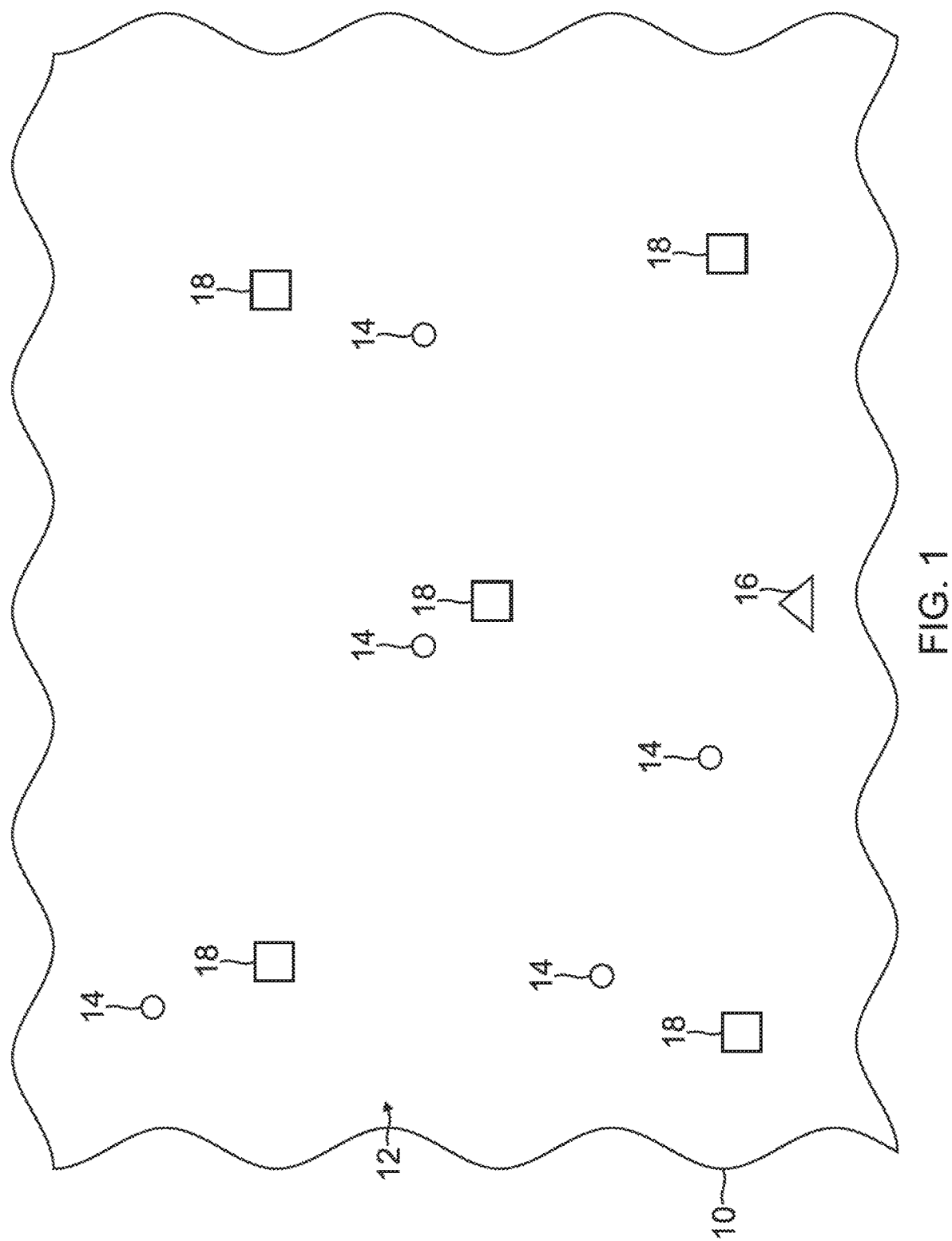
FIG. 1 is a diagram of a system, such as an AeroMACS, according to an embodiment.

With the increase in air traffic, and thus the increase in tarmac congestion, at some airports, it has become desirable that these airports include a traffic-monitoring system that monitors and displays, in real time, the respective positions of all mobile stations. Examples of a mobile station include aircraft, vehicles (e.g., baggage carts, fuel trucks, fire trucks, ambulances), and even personnel such as airport staff. Furthermore, "mobile station" can refer to, e.g., an aircraft, vehicle, or person, or can refer to the monitoring-system electronic circuitry onboard, or carried by, e.g., an aircraft, vehicle, or person. Such a system can, e.g., help airport operators to prevent collisions or other problems resulting from improper positioning or movement of mobile stations, for example, by sounding an alarm, or by otherwise generating a warning, on one or more mobile stations that are in danger of colliding with each other or with another object (but the system may ignore potential collisions, for example, between personnel and another mobile station when the other mobile station is moving at low speed, e.g., at five miles per hour or less).

One such system for which engineers are currently developing standards is an AeroMACS. Airport engineers envision that with an AeroMACS, a mobile station will determine, periodically, its position and report it to one or more AeroMACS servers via one or more base stations that are strategically placed in and around the airport so that wherever a mobile station is located within or around the airport, it will be within communication range of at least one base station. Engineers also envision that an AeroMACS will have other capabilities in addition to traffic monitoring. For example, engineers envision that an AeroMACS will allow a mobile station to report its status (e.g., fuel level, gate assignment, whether any components are malfunctioning) to one or more AeroMACS servers, and to receive instructions (e.g., to leave the gate, to hold its current position until further notice) and other information from the one or more servers.

In today's airport environment, a mobile station, such as an airplane, determines its position using an onboard GNSS circuit or other satellite-based position system, which includes a microprocessor or microcontroller, an electronic signal transmitter-receiver, and other electronic circuitry—hereinafter, "GNSS" refers to a global navigation satellite system, or any other satellite-based position system, and "GNSS circuit" and "GNSS system" refer to the circuitry/system onboard a mobile station for determining the mobile station's position in response to one or more signals received from a GNSS. For a mobile station to determine its ground position, it receives, from each of at least three GNSS satellites, a respective signal including signal packets that each include a respective time stamp and respective ephemeral data including ranging codes. The time stamp indicates at what time the corresponding GNSS satellite transmitted the signal packet, and the ephemeral data indicates from what position the GNSS satellite transmitted the signal packet. By comparing the time stamp from a GNSS signal packet to the time that the mobile station received the packet, the mobile station can determine its distance from the satellite by using the known speed c (the speed of light) of an electromagnetic signal in free space (alternatively, the mobile station's GNSS circuit can use a speed other than c to account for the effective impedance of the earth's atmosphere). Calculating the respective distances between the mobile station and at least three GNSS satellites allows the mobile station's GNSS circuit to determine, unambiguously, the ground position of the mobile station. The mobile station's GNSS circuit determines the mobile station's ground position as the point where the surfaces of three spheres intersect, each sphere having a respective one of the GNSS satellites at its center and having a radius equal to the determined distance between the respective GNSS satellite and the mobile station. The above explanation, and the explanations below, regarding how a mobile station determines its position using GNSS are simplified for purposes of discussion, but it is understood that a mobile station can determine its position in any manner, no matter how complex, that is compatible with a GNSS.

But a problem with requiring all mobile stations, such as baggage-handling vehicles, to determine and report their positions is that outfitting such vehicles with GNSS circuits is often prohibitively expensive for a mobile station that does not already require a GNSS circuit (an example of a mobile station that may require a GNSS circuit is an aircraft).

Furthermore, even if all mobile stations are outfitted with GNSS circuits, a GNSS circuit typically can render a mobile station's position only with an accuracy of approximately ten meters, which, for a ground-based mobile station, is equivalent to rendering the mobile station's position within a circle having an approximately ten-meter radius from the actual position of the mobile station. Unfortunately, this level of accuracy is significantly lower than the one-meter accuracy that the AeroMACS standard specifies for position-tracking applications such as collision avoidance.

To increase the accuracy of a mobile station's GNSS position determination, however, an AeroMACS could include a Ground Based Augmentation System (GBAS).

As explained above, a GNSS circuit onboard a mobile station calculates the ground position of the mobile station by determining the propagation times of GNSS signal packets from at least three GNSS satellites to the mobile station, and by determining the distances between the mobile station and the GNSS satellites at the times at which the GNSS satellites transmitted the signal packets.

For the packet-propagation-time determinations to be accurate, the clocks (one for each GNSS satellite) of the GNSS circuit onboard the mobile station are synchronized with the respective clocks of the GNSS satellites; alternatively, the GNSS circuit can include one clock that is re-synchronized to the clock of each GNSS satellite before making the respective packet-propagation-time measurement.

But although techniques exist for synchronizing the clocks of a GNSS circuit with the GNSS satellite clocks, these techniques still typically yield an accuracy of only about ten meters, which is significantly worse than the one-meter accuracy specified by the AeroMACS standard as described above.

But a GBAS can improve the approximately ten-meter accuracy of a mobile station's GNSS position determination.

A GBAS includes a ground-based GNSS station having a fixed position that is determined, and thus known, very accurately a priori. The GNSS station receives signals from the GNSS satellites within range of the GNSS station, synchronizes its clock/clocks with those of the GNSS satellites in a conventional manner, determines its pseudo position using the GNSS signals from the satellites in a manner such as described above, determines a position error which is, generally, the difference between the pseudo position and the known actual position, and, from the position error, determines clock corrections, and can also determine coordinate corrections (i.e., corrections to the pseudo coordinates of the GNSS station). Each clock correction is the respective time (or phase) shift (positive or negative) that is added to a respective one of the GNSS station's clocks (or that is added to the GNSS station's single clock for each GNSS satellite) to correct the pseudo position of the GNSS station so that it equals the known actual position of the GNSS station. And the coordinate corrections indicate the coordinate corrections needed to correct the pseudo position so that it equals the known actual position of the GNSS station. The coordinate corrections can indicate additional corrections needed to the pseudo coordinates even after the clock corrections are applied. The GBAS GNSS station then broadcasts these clock corrections and coordinate corrections (e.g., in the form of a differential-clock-correction matrix and a coordinate-correction matrix) to the GNSS-enabled mobile stations, each of which synchronizes its clock/clocks, in a conventional manner, to the GNSS satellite clocks, and then adds the clock corrections to its synchronized clock/clocks before determining its position, and adds the coordinate corrections to the determined position to yield a final determined position.

But there may still be problems with an AeroMACS, even if the AeroMACS includes a GBAS.

A GBAS would be in addition to the other components of an AeroMACS, and, therefore, would add significant expense, and significant integration complexity, to the AeroMACS.

Furthermore, because the GBAS GNSS station typically covers a large area (e.g., a radius of twenty three nautical miles around an airport), the accuracies of its clock corrections can vary from mobile station to mobile station. Because the error in a mobile station's GNSS clock/clocks can vary with position and with distance from the respective GNSS satellites, the clock corrections and the coordingate corrections from the GBAS GNSS station can be less accurate the further away a mobile station is from the GBAS GNSS station.

And although including multiple GBAS GNSS stations in a AeroMACS may improve the overall accuracy of the correction to the mobile stations' GNSS clocks and position determination, this would increase significantly the cost of the GBAS and the complexities of integrating the GBAS with the other components of the AeroMACS, and, therefore, would significantly increase the cost and complexity of the AeroMACS.

FIG. 1 is a diagram of an airport 10, which includes an AeroMACS 12 and mobile stations 14, and which can solve some or all of the above-described problems with AeroMACS, according to an embodiment. For a GNSS-enabled mobile station 14, i.e., a mobile station already includes a GNSS circuit, the AeroMACS 12 can eliminate the need for a GBAS, or at least can eliminate the need for a GBAS GNSS station that determines and broadcasts a differential-clock-correction matrix and a coordinate-correction matrix. And for a GNSS-disabled mobile station 14, i.e., a mobile station that does not include a GNSS circuit or that includes a deactivated GNSS circuit, the AeroMACS 12 can provide an infrastructure that allows the mobile station to determine and broadcast its ground position.

The AeroMACS 12 includes one or more servers 16 and one or more base stations 18, which are located at respective fixed, a-priori known, positions in and around an airport. In the described embodiment, the AeroMACS 12 includes one server 16 and multiple base stations 18, and the positions of the base stations are accurately determined (e.g., to a range of less than one meter from a base station's actual position) in a conventional manner. Furthermore, the positions determined for the base stations can be ground-based positions (i.e., with the altitude component of position set to zero), or can be three-dimensional positions (i.e., with altitude component allowed to have a non-zero value). In the described embodiment, it is assumed that the altitude components of the base stations are set to zero.

The base stations 18 are configured to allow communications between the server 16 and the mobile stations 14 much like cell towers are configured to allow communications between mobile phones and a cell base station. For example, the server 16 can be configured to send instructions (e.g., halt, proceed, return to a home position) to a mobile station 14 via the base station 18 that is closest to the mobile station, and a mobile station 14 can be configured to send its current position, its status (e.g., in service, out of service, waiting for an instruction to proceed, instructed task complete), or an acknowledgement (e.g., instruction received) to the server via the base station that is closest to the mobile station. The base stations 18 can be configured to determine which base station is closest to a particular mobile station, even as the mobile station is moving, in much the same way as cell towers determine which cell tower is closest to a mobile phone even while the phone is moving. Furthermore, if a base station 18 closest to a mobile station 14 is out of direct communication range with the server 16, then the base station can be configured to communicate with the server via one or more intermediate base stations that are between the base station and the server. Moreover, because the server 16 and base stations 18 are in fixed positions, they may communicate with one other over a wired channel instead of, or in addition to, a wireless channel.

Furthermore, as described in more detail below in conjunction with FIGS. 2 and 5-6, each of the base stations 18 can be configured to calculate a respective GNSS differential-clock-correction matrix and a coordinate-correction matrix, and to send the matrices to the GNSS-enabled mobile stations 14 so that the AeroMACS 12 can omit a GBAS, or at least can omit the clock-correction and coordinate-correction functions of the GBAS GNSS station. Because the base stations 18 are included in the AeroMACS 12 already, configuring the circuitry of some or all of the base stations 18 to determine respective differential-clock-correction and coordinate-correction matrices adds little or no cost or complexity to the AeroMACS. For example, one may so configure the circuitry of a base station with a change to the base station's software or firmware.

Moreover, as described in more detail below in conjunction with FIGS. 2 and 6-7, the base stations 18 can be configured to broadcast pseudo GNSS signal packets so that GNSS-disabled mobile stations 14 can determine their positions without the need to be fitted, or retrofitted, with a GNSS circuit. Because the base stations 18 are included in the AeroMACS 12 already, configuring the circuitry of some or all of the base stations 18 to broadcast pseudo GNSS signal packets adds little or no cost or complexity to the AeroMACS. For example, one may so configure the circuitry of a base station with a change to the base station's software or firmware. Furthermore, the circuitry on board a mobile station 14 that determines the mobile station's position in response to the pseudo GNSS signal packets can be less complex, can be less costly, and can consume less power than a GNSS circuit.

Still referring to FIG. 1, alternate embodiments of the AeroMACS 12 are contemplated. For example, although it is contemplated that a system provider will provide the AeroMACS 12 including only the server 16, the base stations 18, and the relative software and firmware for the server and base stations, the system provider also can provide, and thus the AeroMACS also can include, some or all of the mobile stations 14 and the software and firmware for the mobile stations. Moreover, although described for instantiation in the airport 10, the AeroMACS 12, or a system like the AeroMACS, can be instantiated in or on a site (e.g., a warehouse) other than an airport.

Figure 2:
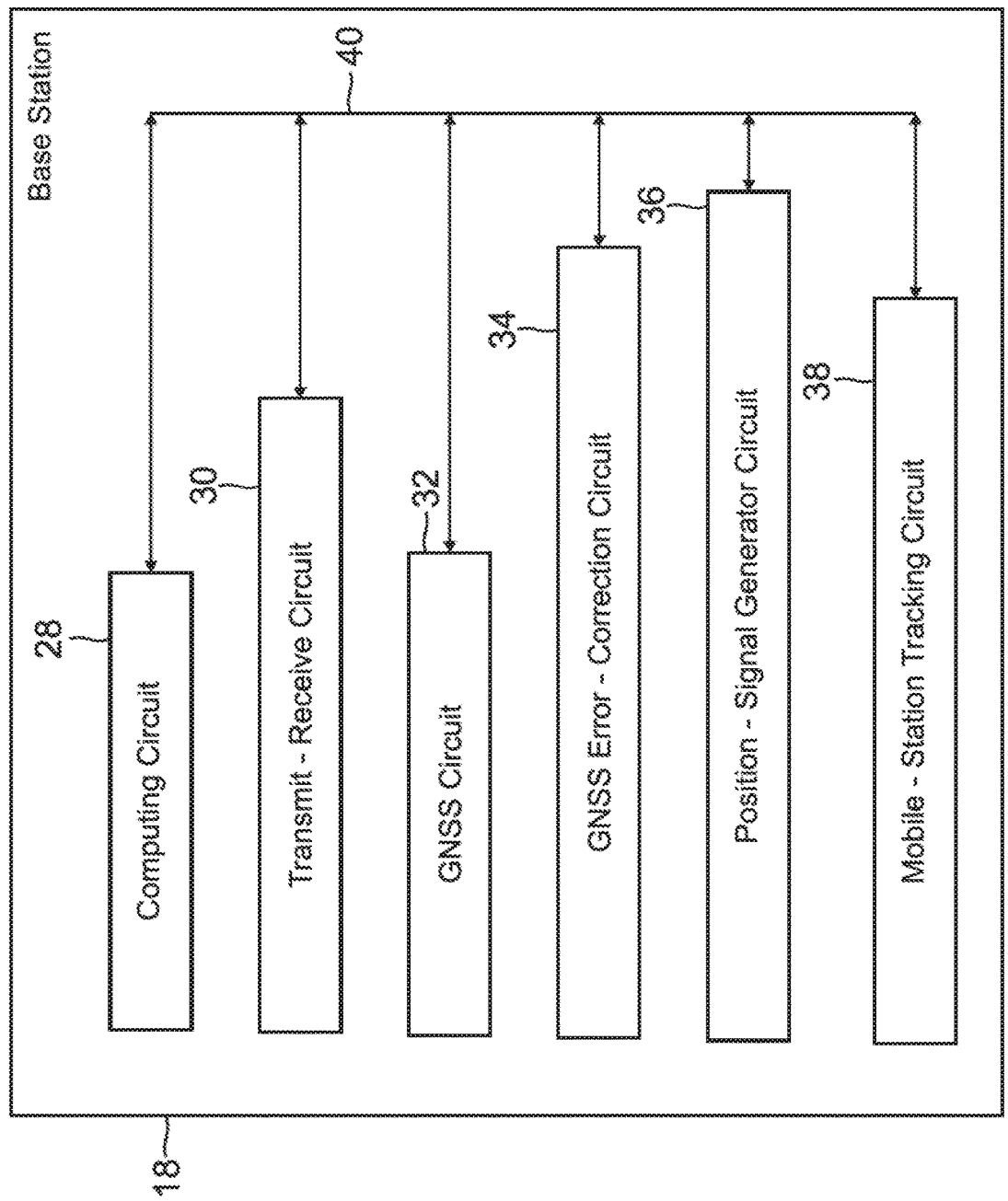
FIG. 2 is a diagram of a base station of the system of FIG. 1, according to an embodiment.

FIG. 2 is a diagram of a base station 18 of FIG. 1, according to an embodiment.

The base station 18 includes the following components: a computing circuit 28, transmit-receive circuit 30, GNSS circuit 32, GNSS error-correction circuit 34, position-signal generation circuit 36, mobile-station tracking circuit 38, and a bus 40, which allows the aforementioned components to communicate with one another.

The computing circuit 28 includes circuitry that is configured to control the operations and the other components of the base station 18, and can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

The transmit-receive circuit 30 includes circuitry that is configured to allow the base station 18 to communicate with the server 16 (FIG. 1) and with one or more of the mobile stations 14 (FIG. 1), and to relay communications between the server and one or more of the mobile stations. For example, the transmit-receive circuit 30 can be configured to allow such communications wirelessly over one or more frequency bands that are used for airport communications or that are otherwise specified by the AeroMACS standard. Or, because the server 16 and base stations 18 are in fixed positions, the transmit-receive circuitry 30 can be configured for wired communication with the server. Furthermore, the transmit-receive circuit 30 can be, or can include, one or more of a conventional instruction-executing circuit such as a microprocessor or microcontroller, a conventional firmware-configurable circuit such as a field-programmable gate array (FPGA), or a conventional hardwired circuit such as an application-specific integrated circuit (ASIC).

The GNSS circuit 32 includes conventional GNSS circuitry that is configured to determine a pseudo position of the base station 18 in response to GNSS signals from three or more GNSS satellites. "Pseudo position" denotes the base station's position as determined by the GNSS circuit 32, and can be different than the actual position of the base station 18 due to errors such as a synchronization error between the clock signal(s) of the GNSS circuit 32 and the clock signals of the GNSS satellites. Furthermore, the GNSS circuit 32 can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

The GNSS error-correction circuit 34 includes circuitry that is configured to compare the base station's pseudo position to its actual position, to determine, in response to the comparison, a position error, and to determine, in response to the position error, a correction to one or more of the clock signals of the GNSS circuit 32 and coordinate corrections after the clock corrections are applied. For example, the GNSS error-correction circuit 34 can be configured to determine the position error equal to a difference between the pseudo position and the actual position. The correction to the clock signal(s) of the GNSS circuit 32 is such that when applied to the GNSS system clock signal(s), the pseudo position equals the actual position within a range (e.g., one-half meter, one meter, three meters, or five meters) specified by, e.g., the AeroMACS standard, and programmed into the computing circuit. 28. The GNSS error-correction circuit 34 is also configured to format these clock corrections (e.g., in a differential-clock-correction matrix) and to send the formatted clock corrections to the transmit-receive circuit 30 for broadcast to one or more mobile stations 14 (FIG. 1) that are within communication range of the base station 18. If the clock corrections do not yield the pseudo position exactly equal to the actual position, then the GNSS circuit 32 can also be configured to generate coordinate corrections, and to send these coordinate corrections (e.g., in a coordinate-correction matrix) to the transmit-receive circuit 30 for broadcast to one or more mobile stations 14 that are within communication range of the base station 18. In calculating the coordinate corrections, the GNSS circuit 32 can be configured to take into account variables such as wind speed, and earth movement. As described below, a GNSS-enabled mobile station 14 can use the formatted clock corrections to correct its own GNSS clocks, and the coordinate corrections to correct its position determination using the corrected GNSS clocks. Furthermore, the GNSS error-correction circuit 34 can be, or can include, one or more of a conventional instruction-executing circuit such as a microprocessor or microcontroller, a conventional firmware-configurable circuit such as a field-programmable gate array (FPGA), and a conventional hard-wired circuit such as an application-specific integrated circuit (ASIC). For example, the GNSS error-correction circuit 34 can be structurally and functionally similar to, or the same as, a GNSS error-correction circuit of a conventional GBAS GNSS station as described above.

The position-signal generator circuit 36 includes circuitry that is configured to generate a position signal including packets that each include a time stamp indicating the time that the packet is sent to the transmit-receive circuit 30 for transmission, the actual position of the base station 18, and other conventional information that allows a GNSS-disabled mobile station 14 (FIG. 1) to determine its position. And the circuit 36 is also configured to provide the position signal to the transmit-receive circuit 30 for broadcast to the mobile station 14. Alternatively, because the position of the base station 18 is fixed, the mobile station 14 or the server 16 may store the actual position of the base station in, e.g., a lookup table (LUT) so that the position-signal generator circuit 36 need not include the base station's actual position in the signal packets.

Furthermore, the position-signal generator circuit 36 can be structurally and functionally similar to GNSS-satellite circuitry that generates a similar position signal, but can be less complex and expensive than GNSS-satellite circuitry. Because the position of the base station 18 is fixed, the circuit 36 need not include circuitry for tracking the base station's position, and, as described above, may be able to forgo including the base station's position in the position-signal packets. Furthermore, because the base station 18 is much closer to the mobile station 14 than are GNSS satellites, the circuit 36 may be able to omit circuitry for encoding the position signal with complex error-correction codes, or for performing, on the position signal, other signal processing that may be used for GNSS signals. Moreover, the position-signal generator circuit 36 can be, or can include, one or more of a conventional instruction-executing circuit such as a microprocessor or microcontroller, a conventional firmware-configurable circuit such as a field-programmable gate array (FPGA), and a conventional hard-wired circuit such as an application-specific integrated circuit (ASIC).

Still referring to FIG. 2, the mobile-station tracking circuit 38 includes circuitry that is configured to track the positions of mobile stations 14 within range of the base station 18, and, based on the tracked positions, to determine which mobile stations, if any, should be linked to the base station. The AeroMACS 12 (FIG. 1) can be designed such that a mobile station 14 communicates only with the closest base station 18 (except for position determining as described below in conjunction with FIGS. 7-8). The tracking circuit 38 is configured to receive the positions of in-range mobile stations 14, and to communicate with other base stations (via the transmit-receive circuit 30 either directly or via the server 16) to identify the mobile stations to which the base station 18 is the closest base station. The tracking circuit 38 is configured to cause the transmit-receive circuit 30 to then set up respective links with the identified mobile stations 14 so that all communications to and from the identified mobile stations 14 come through the base station 18. If a mobile station 14 moves such that it becomes closer to another base station 18, then the tracking circuits 38 of the two base stations cooperate to "hand off" the mobile station from the former closest base station to the current closest base station. During the hand-off process, the tracking circuit 38 of the current closet base station 18 establishes a link to the mobile station 14, and the tracking circuit 38 of the former closest base station 18 closes the link to the mobile station. This track-and-hand-off process is similar to that used by cell towers when a mobile device, such as a smart phone, "roams," i.e., moves from being closest to one cell tower to being closest to another cell tower. The mobile-station tracking circuit 38 can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

Still referring to FIG. 2, other embodiments of the base station 18 are contemplated. For example, one or more of the transmit-receive circuit 30, GNSS circuit 32, GNSS error-correction circuit 34, position-signal generator circuit 36, and mobile-station tracking circuit 38 can be partly or wholly included within the computing circuit 30. That is, the computing circuit 30 can include circuitry configured to perform the functions of one or more of the transmit-receive circuit 30, GNSS circuit 32, GNSS error-correction circuit 34, position-signal generator circuit 36, and mobile-station tracking circuit 38.

Figure 3:
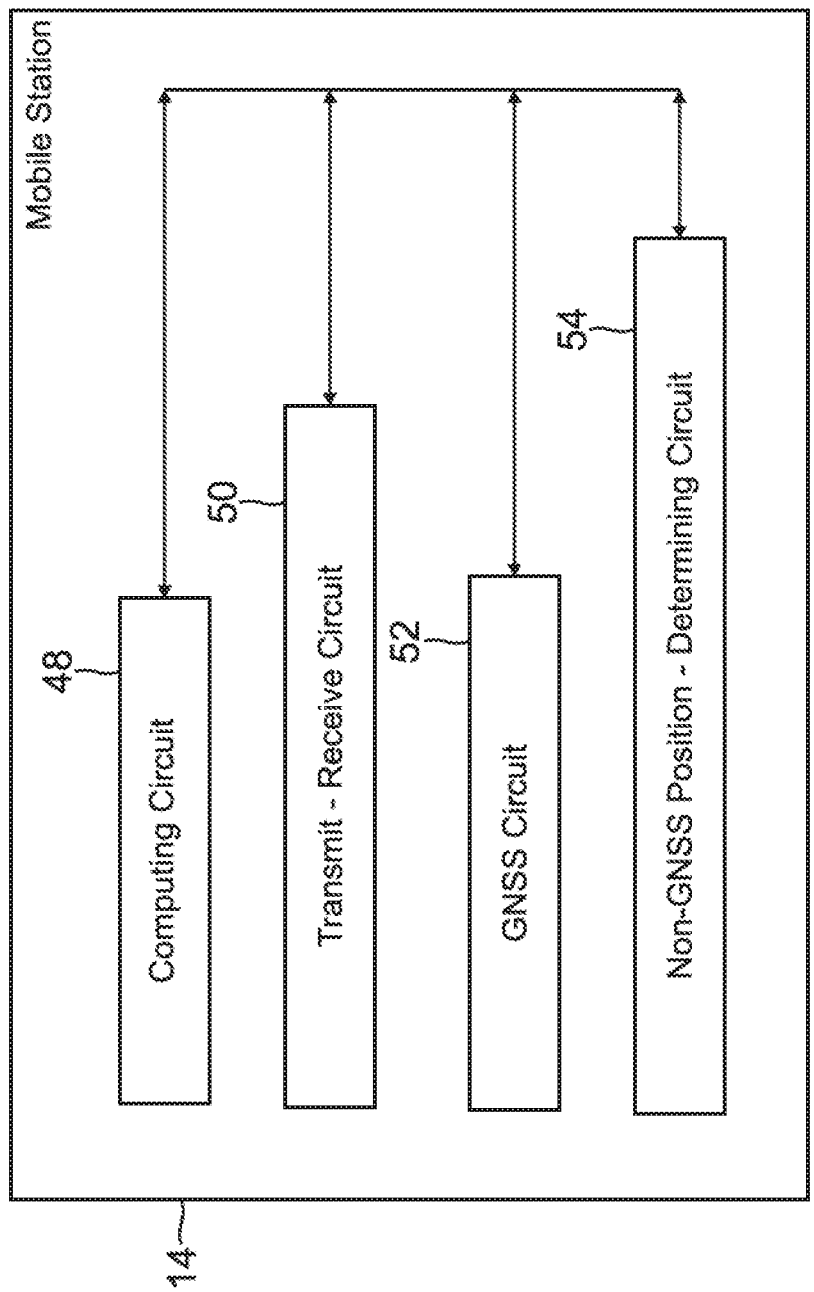
FIG. 3 is a diagram of a mobile station of FIG. 1, according to an embodiment.

FIG. 3 is a diagram of a mobile station 14 of FIG. 1, according to an embodiment.

The mobile station 14 includes the following components: a computing circuit 48, transmit-receive circuit 50, GNSS circuit 52, non-GNSS position-determining circuit 54, and a bus 56, which allows the aforementioned components to communicate with one another. Although the mobile station 14 typically includes the non-GNSS position-determining circuit 54 only if the mobile station does not include the GNSS circuit 52, the mobile station can include both the GNSS circuit and the non-GNSS position-determining circuit such that the mobile station can be selectively GNSS enabled or GNSS disabled.

The computing circuit 48 includes circuitry that is configured to control the operations and the other components of the mobile station 14, and can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

The transmit-receive circuit 50 includes circuitry that is configured to allow the mobile station 14 to communicate with one or more of the base stations 18 (FIGS. 1-2), and to communicate with the server 16 directly or via a base station (e.g., the base station closest to the mobile station). For example, the transmit-receive circuit 50 can be configured to allow such communications wirelessly over one or more frequency bands that are used for airport communications or that are otherwise specified by the AeroMACS standard. Furthermore, the transmit-receive circuit 50 can be, or can include, one or more of a conventional instruction-executing circuit such as a microprocessor or microcontroller, a conventional firmware-configurable circuit such as a field-programmable gate array (FPGA), or a conventional hardwired circuit such as an application-specific integrated circuit (ASIC).

The GNSS circuit 52 includes conventional GNSS circuitry that is configured to determine a position of the mobile station 14 in response to GNSS signals from three or more GNSS satellites. The GNSS circuit 52 can also be configured to use the clock corrections and coordinate corrections broadcast from one or more base stations 18 (FIGS. 1-2) to improve the accuracy of its GNSS position determination as described above and as described below in conjunction with FIGS. 5-6. Because clock error and coordinate error can be a function of position, the GNSS circuit 52 can use only the clock corrections and coordinate corrections broadcast over an established link between the mobile station 14 and the base station 18 closest to the mobile station. Or, the GNSS circuit 52 can generate clock corrections and coordinate corrections from the clock corrections broadcast by multiple closest base stations 18, e.g., by a weighted averaging of the clock corrections and the coordinate corrections from the multiple base stations. The transmit-receive circuit 50 can receive the clock corrections and coordinate corrections from the multiple closest base stations 18 via respective links to each of these base stations, via a link to the closest base station, or via a link to the server 16 (FIG. 1). Furthermore, if the AeroMACS 12 includes a GBAS, then the GNSS circuit 52 can be configured to use the clock corrections and coordinate corrections broadcast from the GBAS GNSS station as described above. Moreover, the GNSS circuit 52 can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

The non-GNSS position-determining circuit 54 includes circuitry that is configured to determine the position of the mobile station 14 in response to position signals broadcast from at least three base stations 18 (e.g., the three base stations closest to the mobile station) in a manner similar to the manner in which a GNSS circuit, such as the GNSS circuit 52, determines the position of a mobile station in response to position signals broadcast from at least three GNSS satellites.

The non-GNSS position-determining circuit 54 is configured to receive, from each of at least three base stations 18 via the transmit-receive circuit 50, a respective position signal including at least one signal packet that each include a time stamp and that can also include a position of the source base station. As discussed above, the time stamp indicates at what time the corresponding base station 18 transmitted the signal packet. By comparing the time stamp from the base-station signal packet to the time that the mobile station 14 receives the packet, the position-determining circuit 54 can determine the mobile station's distance from the source base station 18 by using the known speed c of an electromagnetic signal in free space (alternatively, the position-determining circuit can use a speed other than c to account for the effective impedance of the earth's atmosphere). Calculating the respective distances between the mobile station 14 and at least three base stations 18 allows the position-determining circuit 54 to determine, unambiguously, the ground position of the mobile station. The position-determining circuit 54 determines the mobile station's ground position as the point where the perimeters of at least three coplanar circles overlap, each circle having a respective one of the base stations 18 at its center and having a radius equal to the determined distance between the respective base station and the mobile station 14.

Although the non-GNSS position-determining circuit 54 can operate in a manner similar to that of the GNSS circuit 52, the position-determining circuit can be less complex and less expensive than the GNSS circuit 52. If the known fixed positions of the base stations are not included in the signal packets, then the position-determining circuit 54 need not include circuitry for recovering the base-station positions from the signal packets (as alluded to above in conjunction with FIG. 2, the position-determining circuit 54 can store the base-station positions in a LUT, or receive them separately from the server 16). Furthermore, because the position-determining circuit 54 is configured to determine the position of the mobile station 14 from position signals broadcast by the ground-based base stations 18, the position-determining circuit can be less complex than corresponding GNSS circuitry because the position-determining circuit need only calculate intersecting circles, not intersecting spheres. Moreover, because the base stations 18 are much closer to the mobile station 14 than are GNSS satellites, the position-determining circuit 54 may be able to omit circuitry for decoding the position signal using complex error-correction codes, or for performing, on the position signal, other signal processing that may be used for GNSS signals. In addition, because the base stations 18 are much closer to the mobile station 14 than are GNSS satellites, the position-determining circuit 54 may be able to omit circuitry for correcting its clock signals and coordinates, or such circuitry may be less complex than GNSS clock-correction and coordinate-correction circuitry. For example, the server 16 can synchronize the base-station and mobile-station clock signals in a conventional manner, or the position-determining circuit 54 can be configured to use a simplified clock-synchronizing algorithm (as compared to a GNSS clock-synchronizing algorithm), such as the following algorithm. A base station 18 transmits to the mobile station 14 a time stamp indicating the time of time-stamp transmission. The position-determining circuit 54 denotes the time that it receives the time stamp from the transmit-receive circuit 50, determines a delay DELAY from the receipt time to a selected transmit time, generates a packet that includes DELAY, and then instructs the transmit-receive circuit 50 to transmit the packet to the base station 18 at the selected transmit time. Assuming that the movable station 14 has moved a negligible distance during the time that the above algorithm takes, and that there has been a negligible change in atmospheric conditions, it can be assumed that the signal-propagation time from base station to moveable station equals the signal-propagation time from moveable station to base station. Therefore, the base station 18 determines that the total time from its transmission of the time stamp to the movable station 14, to the receipt of the delay packet from the movable station 14, equals 2x+DELAY, where x is the signal-propagation time. The base station 18 then sends another signal including a time stamp indicating the time of transmission and the determined value of x. The position-determining circuit 54 receives this signal, and "knows" that that at time of receipt, its clock should equal a time of x (plus any internal delay) ahead of the time indicated by the time stamp. If the clock of the circuit 54 does not equal this time, then it can be corrected so that it would have equaled this time. In addition, the position-determining circuit 54 can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC).

Still referring to FIG. 3, other embodiments of the mobile station 14 are contemplated. For example, one or more of the transmit-receive circuit 50, GNSS circuit 52, and non-GNSS position-determining circuit 54 can be partly or wholly included within the computing circuit 48. That is, the computing circuit 48 can include circuitry configured to perform the functions of one or more of the transmit-receive circuit 50, GNSS circuit 52, and non-GNSS position-determining circuit 54.

Figure 4:
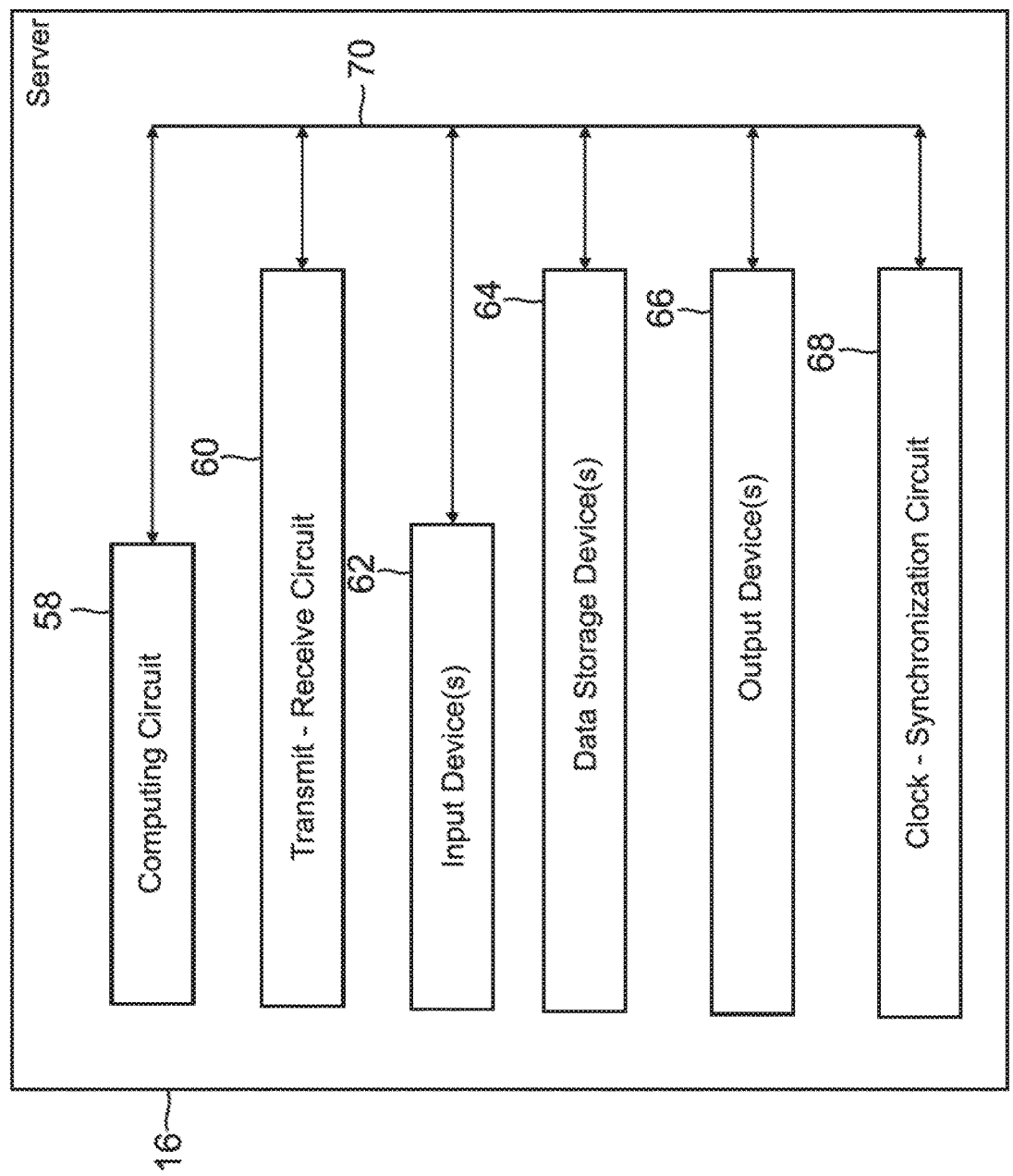
FIG. 4 is a diagram of a server of the system of FIG. 1, according to an embodiment.

FIG. 4 is a diagram of the server 16 of FIG. 1, according to an embodiment.

The server 16 includes the following components: a computing circuit 58, transmit-receive circuit 60, one or more input devices 62, one or more data-storage devices 64, one or more output devices 66, a clock-synchronization circuit 68, and a bus 70, which allows the aforementioned components to communicate with one another.

The computing circuit 58 includes circuitry that is configured to control the operations and the other components of the server 16, and can be, or can include, one or more of a conventional instruction-executing circuit such as a microprocessor or microcontroller, a conventional firmware-configurable circuit such as a field-programmable gate array (FPGA), and a conventional hardwired circuit such as an application-specific integrated circuit (ASIC). The computing circuit 68 can also include circuitry that is configured to control the operations of the mobile stations 14 (FIG. 1) and of the base stations 18 (FIG. 1), to map the locations of the mobile stations and base stations, and to implement one or more algorithms, such as a collision-avoidance algorithm to prevent collisions between two or more mobile stations, or between a mobile station and a base station.

The transmit-receive circuit 60 includes circuitry that is configured to allow the server 16 to communicate with the base stations 18 (FIGS. 1-2) directly or in a daisy-chain fashion, and to communicate with the mobile stations 14 directly, in a daisy-chain fashion, or via a base station (e.g., the base station closest to the mobile station). For example, the transmit-receive circuit 60 can be configured to allow such communications wirelessly over one or more frequency bands that are used for airport communications or that are otherwise specified by the AeroMACS standard. Or, because the server 16 and the base stations 18 are in fixed positions, the transmit-receive circuitry 60 can be configured for wired communication with the base stations. Furthermore, the transmit-receive circuit 60 can be, or can include, one or more of a conventional instruction-executing circuit such as a microprocessor or microcontroller, a conventional firmware-configurable circuit such as a field-programmable gate array (FPGA), or a conventional hardwired circuit such as an application-specific integrated circuit (ASIC).

The one or more input devices (e.g., keyboard, mouse) 62 are configured to allow the providing of data, programming, commands, and other information to the computing circuitry 58 by, e.g., a human operator (not shown in FIG. 4).

The one or more data-storage devices (e.g., flash drive, hard disk drive, RAM, optical drive) 64 allows for the storage of, e.g., programs and data. For example, a data-storage device 64 can be configured to implement and to store a LUT having the positions of the base stations 18 as described above.

The one or more output devices (e.g., display, printer, speaker) 66 are configured to allow the computing circuitry 58 to provide data in a form perceivable by a human operator.

The clock-synchronization circuit 68 includes circuitry configured to synchronize the clock(s) of a base station's position-signal generator circuit 36 (FIG. 2) with the clock(s) of a mobile station's non-GNSS position-determining circuit 54 (FIG. 3) in any suitable manner. For example, the circuit 68 can be configured to include a master clock (e.g., an atomic clock, or a clock synchronized to another reference clock via, e.g., the internet), and can synchronize the base-station and mobile-station clocks to the master clock taking into account the distances, and thus the signal-propagation delays, between the server 16 and the mobile stations 14 and between the server and the base stations 18.

Still referring to FIG. 4, other embodiments of the server 16 are contemplated. For example, one or more of the transmit-receive circuit 60, one or more input devices 62, one or more data-storage devices 64, one or more output devices 66, and clock-synchronization circuit 68 can be partly or wholly included within the computing circuit 58. That is, the computing circuit 58 can include circuitry configured to perform the functions of one or more of the transmit-receive circuit 60, one or more input devices 62, one or more data-storage devices 64, one or more output devices 66, and clock-synchronization circuit 68. Furthermore, the server 16 can include circuitry that is configured to generate coordinate corrections (in the form, e.g., of a coordinate-correction matrix), and to send these coordinate corrections to a mobile station 14 that is GNSS disabled such that the mobile station can use the coordinate corrections in conjunction with the position signals from at least three base stations 18 to determine its position (the mobile station 14 can be configured to use these coordinate corrections from the server in a manner similar to how a GNSS-enabled mobile station 14 uses coordinate corrections from a base station 18). And these coordinate corrections can consider variables such as wind speed and earth movement.

Figure 5:
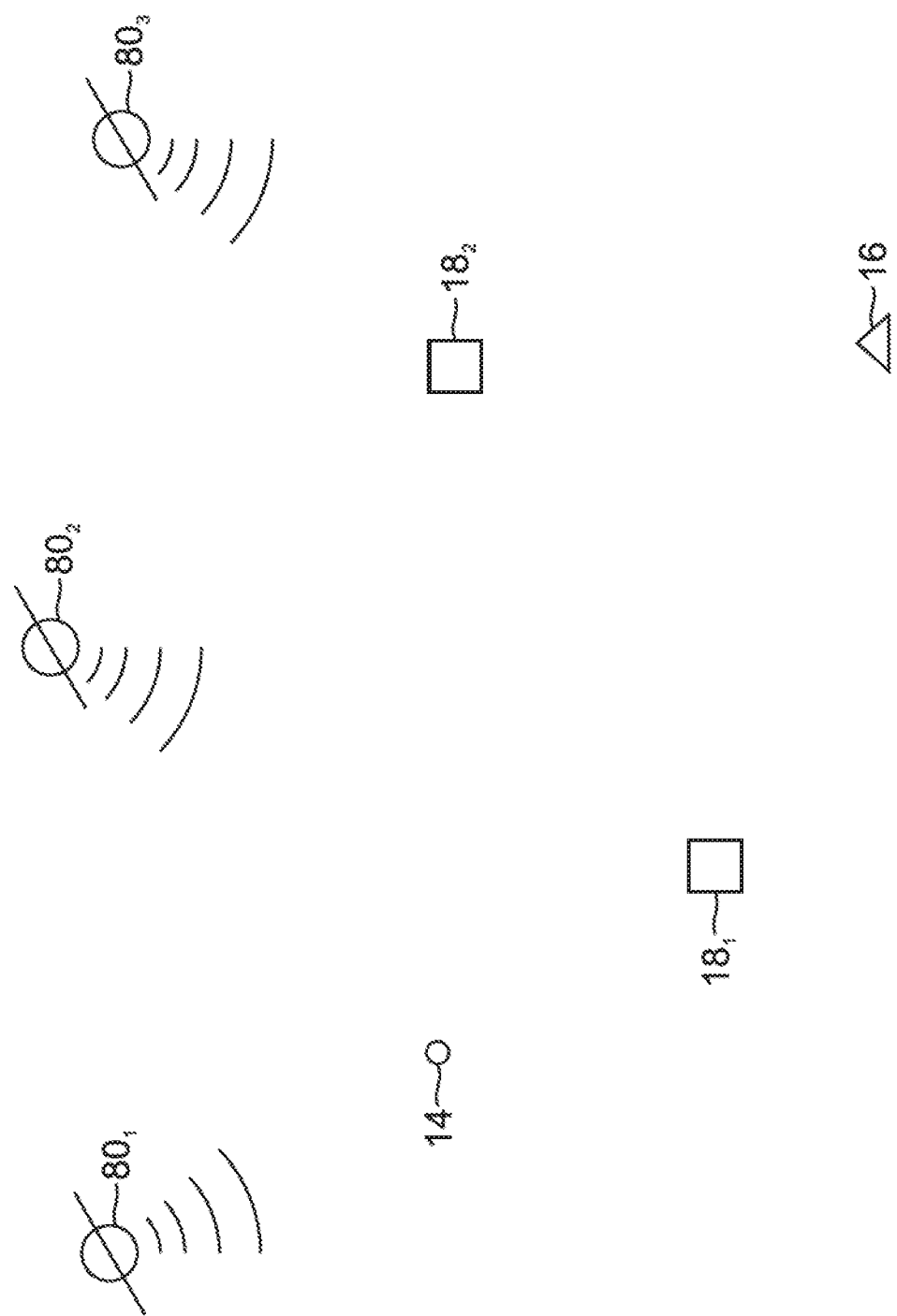
FIG. 5 is a diagram of base stations and the server of the system of FIG. 1, of a GNSS-enabled mobile station of FIG. 1, and of GNSS satellites, according to an embodiment.

FIG. 5 is a diagram of a GNSS-enabled mobile station 14 (FIGS. 1 and 3), server 16 (FIGS. 1 and 4), two base stations $18_1$-$18_2$ (FIGS. 1 and 2), and GNSS satellites $80_1$-$80_3$, according to an embodiment. For example, the server 16 and base stations 18 can be part of the AeroMACS 12 of FIG. 1.

Figure 6:
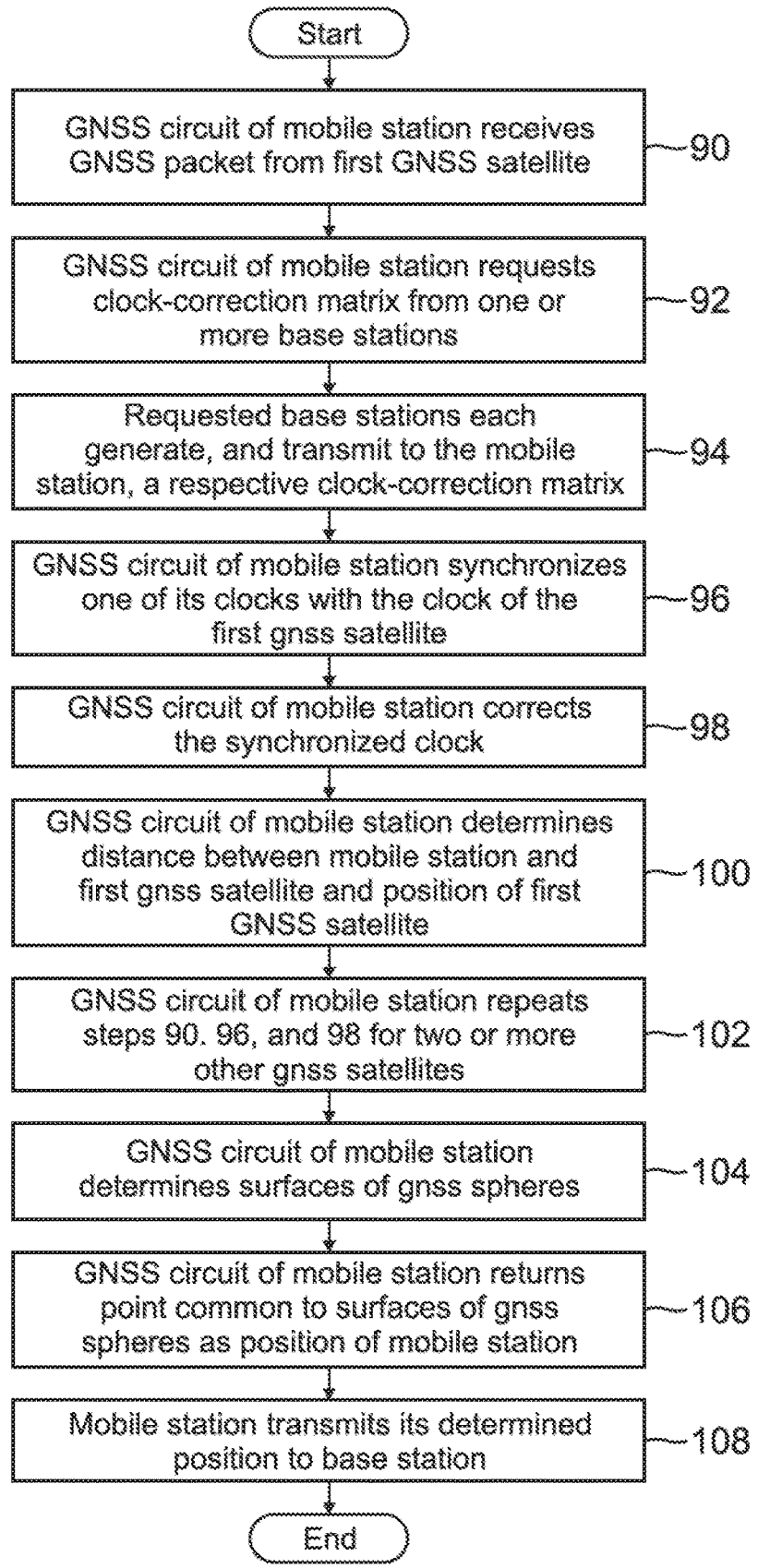
FIG. 6 is a flow diagram of a method in which a base station of FIG. 5 provides information that increases the accuracy of a GNSS position determination made by the mobile station of FIG. 5, according to an embodiment.

FIG. 6 is a flow chart of a method that the mobile station 14 of FIG. 5 can implement to determine its position using its GNSS circuit 52 (FIG. 3), according to an embodiment. To reduce the cost and complexity of a system such as the AeroMACS 12 of FIG. 1, the method uses at least one base station 18 to correct the clocks of the mobile station's GNSS circuit 52 instead of using a GNSS station of a GBAS.

Referring to FIGS. 5-6, operation of the mobile station 14 and base stations $18_1$ and $18_2$ during a position-determining-and-providing mode of the mobile station is described, according to an embodiment.

At a step 90, the GNSS circuit 52 (FIG. 3) of the mobile station 14 receives a GNSS packet from the GNSS satellite $80_1$, where the packet includes a time stamp indicating when the satellite sent the packet, and includes information indicating the position of the satellite when the satellite sent the packet.

Next, at a step 92, the GNSS circuit 52 of the mobile station 14 requests a first clock-correction matrix from the base station $18_1$, which is the closest base station to the mobile station. Alternately, the GNSS circuit 52 also requests a second clock-correction matrix from the base station $18_2$, which is the second closest base station to the mobile station. The GNSS circuit 54 may also request first, or first and second, coordinate-correction matrices from the base stations $18_1$, or $18_1$ and $18_2$, respectively.

Then, at a step 94, the base station $18_1$ generates the first clock-correction matrix as described above in conjunction with FIG. 2 and elsewhere, and transmits, via its transmit-receive circuit 30, the matrix to the mobile station 14. And if the GNSS circuit 52 requested the second clock-correction matrix, then the base station $18_2$ generates the second clock-correction matrix and transmits, via its transmit-receive circuit 30, the second matrix to the mobile station 14. And if the GNSS circuit 54 requested first, or first and second, coordinate-correction matrices, then the the base station $18_1$, or the base stations $18_1$ and $18_2$, respectively, generates/generate the first, or first and second, coordinate-correction matrices, and transmits/transmit the requested matrix/matrices to the mobile station 14.

Next, at a step 96, the GNSS circuit 52 of the mobile station 14 synchronizes one of its clocks with the clock of the GNSS satellite $80_1$ in a conventional manner.

Then, at a step 98, the GNSS circuit 52 of the mobile station 14 applies to the synchronized clock a corresponding correction from the first clock-correction matrix. Alternately, the GNSS circuit 52 can take the weighted average of the corresponding clock corrections from the first and second clock-correction matrices, where the weighting is based on the distances between the mobile station 14 and base stations $18_1$ and $18_2$ (the corresponding correction from the second clock-correction matrix is given less weight than the corresponding correction from the first clock-correction matrix because the base station $18_2$ is farther from the mobile station than is the base station $18_1$). Or the server 16 can perform this weighted averaging. Continuing with this alternative, the GNSS circuit 52 then applies to its synchronized clock the weighted clock correction.

Next, at a step 100, the GNSS circuit 52 of the mobile station 14 uses the corrected-and-synchronized clock signal to determine, in a conventional manner, the distance between the mobile station 14 and the position of the GNSS satellite $80_1$ at the time that the satellite transmitted the GNSS packet.

Then, at a step 102, the GNSS circuit 52 of the mobile station 14 repeats the steps 90, 96, and 98 for the other two GNSS satellites $80_2$ and $80_3$.

Next, at a step 104, the GNSS circuit 52 of the mobile station 14 conventionally determines respective equations that respectively define the positions of the surfaces of three spheres (not shown in FIG. 5) each having a respective one of the satellites 80 at its center and each having a radius equal the determined distance between the mobile station 14 and the respective one of the satellites.

Then, at a step 106, the GNSS circuit 52 of the mobile station 14 identifies, in a conventional manner, a point that is common to the surfaces of all three spheres (i.e., the point where the surfaces of all three spheres intersect), and returns the coordinates of this point as the location of the mobile station 14. The GNSS circuit 52 can also apply any requested coordinate corrections (after weighted averaging if appropriate) to the determined position before yielding a final position.

Next, at step 108, the mobile station 14 transmits its position, as determined by its GNSS circuit 52, via the transmit-receive circuit 50 to the closest base station $18_1$, which provides the determined position to the server 16.

Still referring to FIGS. 5-6, alternate embodiments of the GNSS positioning-determining algorithm are contemplated. For example, the GNSS circuit 52 (FIG. 3) of the mobile station 14 can determine the position of the mobile station from more than three (e.g., four) GNSS satellites 80. Furthermore, the GNSS circuit 52, or the server 16, can determine a weighted clock correction from the clock corrections from more than two base stations 18, and can determine a weighted coordinate correction from the coordinate corrections from more than two base stations.

Figure 7:
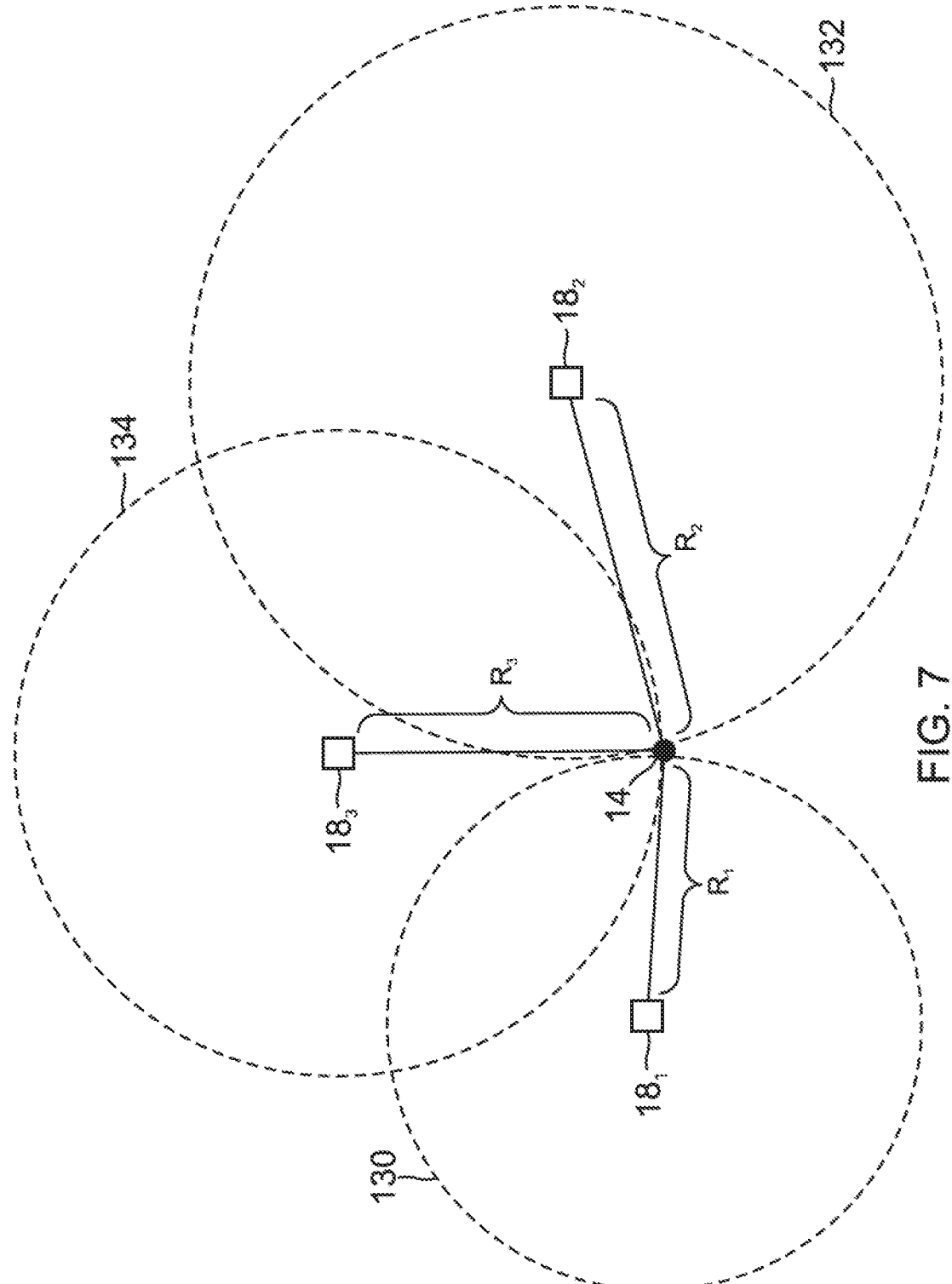
FIG. 7 is a diagram of base stations and the server of the system of FIG. 1, and of a GNSS-disabled mobile station of FIG. 1.

FIG. 7 is a diagram of a non-GNSS-enabled mobile station 14 (FIGS. 1 and 3), server 16 (FIGS. 1 and 4) and three base stations $18_1$-$18_3$ (FIGS. 1 and 2), according to an embodiment. For example, the server 16 and base stations 18 can be part of the AeroMACS 12 of FIG. 1.

Figure 8:
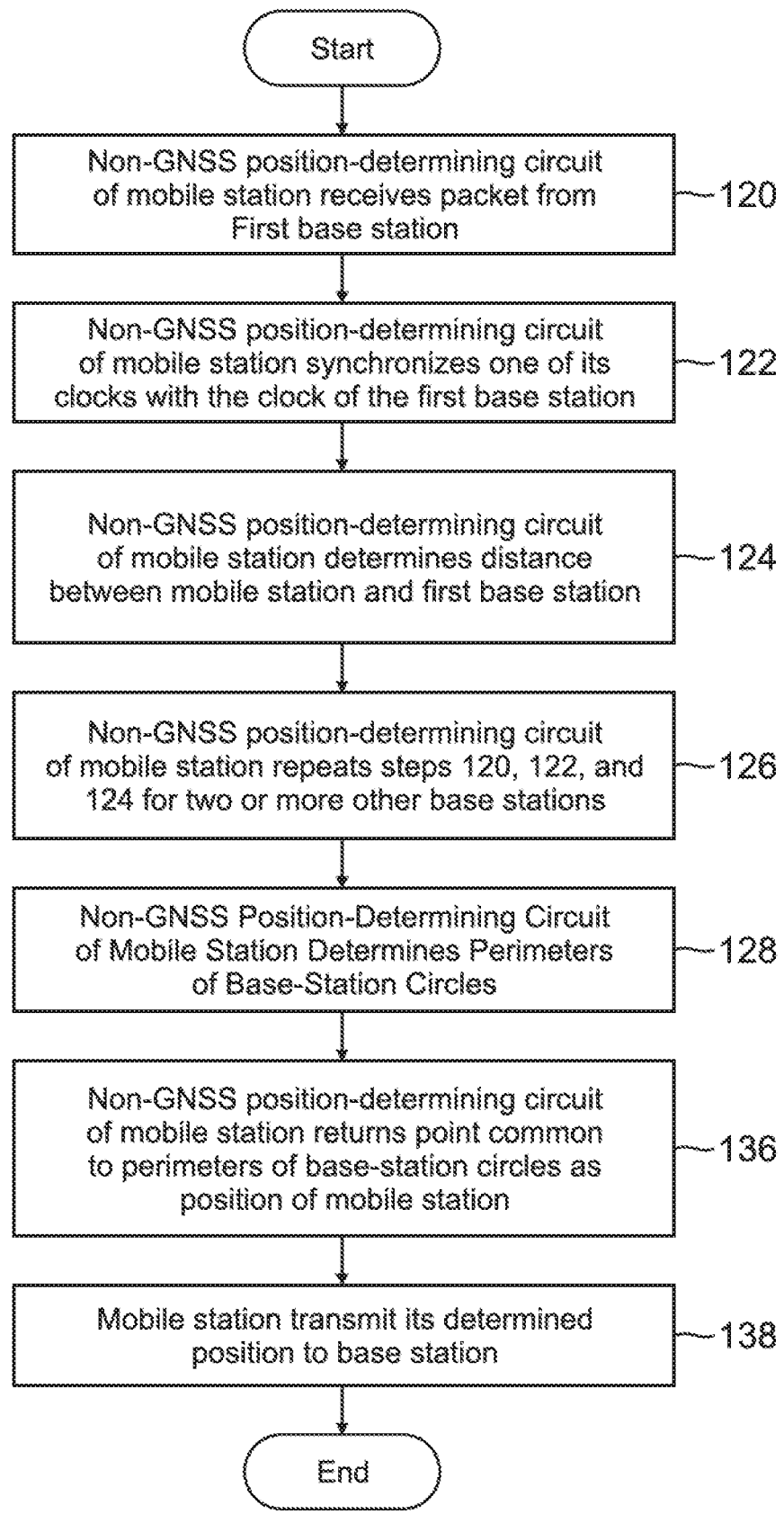
FIG. 8 is a flow diagram of a method in which the base stations of FIG. 7 provide information from which the GNSS-disabled mobile station of FIG. 7 can determine its position, according to an embodiment.

FIG. 8 is a flow chart of a method that the mobile station 14 of FIG. 7 can implement to determine its position without using a GNSS circuit 52 (FIG. 3), according to an embodiment. For example, the mobile station 14 may be, e.g., a baggage cart for which it is too expensive to outfit with a GNSS circuit. To reduce the cost and complexity of a system such as the AeroMACS 12 of FIG. 1, the mobile station 14 uses position signals from at least three base stations 18, instead of from GNSS satellites, to determine the position of the mobile station.

Referring to FIGS. 7-8, operation of the mobile station 14 and base stations $18_1$-$18_3$ during a non-GNSS-position-determining-and-providing mode of the mobile station is described below, according to an embodiment.

At a step 120, the non-GNSS position-determining circuit 54 (FIG. 3) of the mobile station 14 receives a position packet from the first base station $18_1$, where the packet includes a time stamp indicating when the base station sent the packet, and includes information indicating the position of the base station, which position is fixed. Alternatively, the circuit 54 may have the position of the base station $18_1$ stored in an LUT, or may retrieve the position of the base station from the server 16.

Next, at a step 122, the non-GNSS position-determining circuit 54 of the mobile station 14 synchronizes one of its clocks with the clock of the position-signal generator circuit 36 (FIG. 2) of the base station $18_1$ as described above in conjunction with FIG. 3, or in any other suitable manner. Alternatively, the server 16 can perform this clock synchronization as described above in conjunction with FIG. 4.

Then, at a step 124 the non-GNSS position-determining circuit 54 of the mobile station 14 uses the synchronized clock signal to determine, in a conventional manner, the distance between the mobile station 14 and the base station $18_1$.

Next, at a step 126, the non-GNSS position-determining system 54 of the mobile station 14 repeats the steps 120, 122, and 124 for the other two base stations $18_2$ and $18_3$.

Then, at a step 128, the non-GNSS position-determining circuit 54 of the mobile station 14 conventionally determines respective equations that respectively define the positions of the perimeters of three circles 130, 132, and 134 having, at their centers, the base stations $18_1$, $18_2$, and $18_3$, respectively, and each having a respective radius $R_1$, $R_2$, and $R_3$ equal the respective determined distances between the mobile station 14 and the base stations.

Next, at a step 136, the non-GNSS position-determining circuit 54 of the mobile station 14 identifies, in a conventional manner, a point that is common to all three perimeters of the circles 130, 132, and 134 (i.e., the point where the perimeters of all three circles intersect), and returns the coordinates of this point as the position of the mobile station 14. Furthermore, the server 16 can determine coordinate corrections taking into account, e.g., wind speed and earth movement, and the non-GNSS position-determining circuit 54 can receive these coordinate corrections from the server 16, and apply these coordintate corrections to the determined position of the mobile station before yielding final coordinates of the position.

Then, at a step 138, the mobile station 14 transmits its position, as determined by its non-GNSS position-determining circuit 54, via the transmit-receive circuit 50 to the closest base station $18_1$, which provides the determined position to the server 16.

Still referring to FIGS. 7-8, alternate embodiments of the non-GNSS positioning-determining algorithm are contemplated. For example, the non-GNSS position-determining circuit 54 (FIG. 3) of the mobile station 14 can determine the position of the mobile station from more than three base stations 18.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A system, comprising:
a plurality of base stations each having a respective fixed position and each configured to broadcast information that a mobile station can use to determine a position of the mobile station, wherein each of the plurality of base stations includes:
a clock circuit configured to generate a clock signal;
a position-signal generator circuit configured to generate a position signal including the fixed position of the base station;
a global navigation satellite system (GNSS) circuit configured to determine a pseudo position of the base station, the pseudo position of the base station determined by a signal from at least one GNSS satellite and a synchronization error between the clock signal of the clock circuit and a clock signal received from the at least one GNSS satellite;
an error circuit configured to generate a coordinate-correction matrix in response to the fixed position and the pseudo position of the base station; and
a transmit circuit configured to broadcast the position signal and an error in the clock signal including the coordinate-correction matrix to a mobile station, wherein the error in the clock signal is based on the fixed position and the pseudo position of the base station; and
a server configured to communicate with the base stations and to track a position of a mobile station.

2. The system of claim 1 wherein each of the plurality of base stations further includes:
an error circuit configured to:
determine a position difference between the fixed position and the pseudo position of the base station, and
determine the error in the clock signal in response to the position difference.

3. The system of claim 1 wherein the transmit circuit of each of the plurality of base stations is further configured to:
broadcast the position signal and the error to a mobile station having a position-determining circuit configured to determine a position of the mobile station in response to the error and a transmitter to send the determined position to the server.

4. The system of claim 1 wherein the server includes:
an error circuit configured to:
determine a position difference between the fixed position and the pseudo position of the base station, and
determine the error in the clock signal in response to the position difference; and
a transmit circuit configured to send the error to the base station.

5. The system of claim 1 wherein:
the transmit circuit of each of the plurality of base stations is further configured to send the pseudo position of the respective base station to the server and to broadcast the error in the clock signal to a mobile station having:
a position-determining circuit configured to determine a position of the mobile station in response to the error, and
a transmitter to send the determined position to the server; and
the server includes:
an error circuit configured to:
determine a position difference between the fixed position and the pseudo position of the base station, and
determine the error in the clock signal in response to the position difference; and
a transmit circuit configured to send the error to the base station.

6. The system of claim 1 wherein the clock circuit of each of the plurality of base stations is further configured to generate a time stamp; wherein the transmit circuit of each of the plurality of base stations is further configured to broadcast the time stamp and the position of the base station to a mobile station; and wherein the mobile station includes a position-determining circuit configured to determine a position of the mobile station in response to the time stamp and the position of the base station.

7. The system of claim 1 wherein the clock circuit is further configured to generate a time stamp; and
wherein the transmit circuit of each of the plurality of base stations is further configured to broadcast the time stamp and the position of the base station to a mobile station having:
   a position-determining circuit configured to determine a position of the mobile station in response to the time stamp and the position of the base station, and
   a transmitter to send the determined position to the server.

8. The system of claim 1 wherein the clock circuit of each of the plurality of base stations is further configured to generate a base-station clock signal and a time stamp; and
wherein the transmit circuit of each of the plurality of base stations is further configured to broadcast the time stamp and the position of the base station to a mobile station, the mobile station including:
   a clock circuit configured to generate a mobile-station clock signal;
   a clock-synchronizing circuit configured to synchronize the mobile-station clock signal with the base-station clock signal; and
   a position-determining circuit configured to determine a position of the mobile station in response to the time stamp, the mobile-station clock signal, and the position of the base station.

9. The system of claim 1 wherein:
the clock circuit of each of the plurality of base stations is further configured to generate a base-station clock signal and a time stamp; and
wherein the transmit circuit of each of the plurality of base stations is further configured to broadcast the time stamp and the position of the base station to a mobile station, the mobile station including:
   a clock circuit configured to generate a mobile-station clock signal; and
   a position-determining circuit configured to determine a position of the mobile station in response to the time stamp, the mobile-station clock signal, and the position of the base station; and
wherein the server includes a clock-synchronizing circuit configured to synchronize the mobile-station clock signal with the base-station clock signal.

10. A system, comprising:
a plurality of base stations each having a respective fixed position and configured to broadcast information that a mobile station can use to determine a position of the mobile station, the information including a coordinate-correction matrix, wherein each of the plurality of base stations includes:
   a clock circuit configured to generate a clock signal;
   a global-navigation-satellite-system (GNSS) circuit configured to determine a pseudo position of the base station, the pseudo position of the base station determined by a signal from at least one GNSS satellite and a synchronization error between the clock signal of the clock circuit and a clock signal received from the at least one GNSS satellite; and
   an error circuit configured to generate the coordinate-correction matrix in response to the fixed position and the pseudo position of the base station; and
a server configured to communicate with the base stations and to track a position of a mobile station based on the coordinate-correction matrix, wherein the coordinate-correction matrix is based on the fixed position and the pseudo position of the base station.

11. The system of claim 10, wherein the server includes an error circuit configured to generate the coordinate-correction matrix in response to the fixed position and the pseudo position of one of the base stations.

* * * * *